Nov. 26, 1963 W. C. RUPP 3,111,876
AUTOMATIC GAUGE FOR PAPER CUTTING MACHINES AND THE LIKE
Filed Dec. 30, 1959 3 Sheets-Sheet 1

INVENTOR.
WILLIAM C. RUPP
BY
Oberlin, Maky & Donnelly
ATTORNEYS

INVENTOR.
WILLIAM C. RUPP
BY
Oberlin, Maky & Donnelly
ATTORNEYS

Nov. 26, 1963 W. C. RUPP 3,111,876
AUTOMATIC GAUGE FOR PAPER CUTTING MACHINES AND THE LIKE
Filed Dec. 30, 1959 3 Sheets-Sheet 3

INVENTOR.
WILLIAM C. RUPP
BY
Oberlin, Maky & Donnelly
ATTORNEYS

United States Patent Office 3,111,876
Patented Nov. 26, 1963

3,111,876
AUTOMATIC GAUGE FOR PAPER CUTTING
MACHINES AND THE LIKE
William C. Rupp, Parma, Ohio, assignor to The Chandler & Price Company, Cleveland, Ohio, a corporation of Ohio
Filed Dec. 30, 1959, Ser. No. 862,841
6 Claims. (Cl. 83—207)

This invention relates as indicated to an automatic gauge for paper cutting machines and the like, and more particularly to automatic power driven mechanism for positioning such gauge in relation to the knife of the machine or other fixed point of reference.

When making a series of cuts in a stack of sheets for example, it is desired to advance the back gauge in appropriate increments properly to position the stack for each such cut. When the process is to be repeated several times, there is a considerable saving in time and a greater likelihood of accuracy if appropriate stops may be preset to determine each increment of advance of the back gauge. Various devices for this purpose have been proposed in the past including, for example, the one described and claimed in Jirousek Patent 2,270,848. The present invention constitutes an improvement on the apparatus disclosed and claimed in my prior Patent 2,781,093.

In the recent past, banks have made considerable efforts to standardize their processing procedures, especially check sorting. Code numbers are applied to the checks of different accounts in magnetic ink and an appropriate electronic machine is employed to "read" such numbers and correspondingly assort the checks. It is very important, however, that the magnetic code numbers be printed in precisely located positions on the checks relative to the margins thereof, or the electronic machine will be unable to handle them. For this reason, it has become correspondingly important that a paper cutting machine be provided capable of rapidly cutting up a stack of sheets of blank checks with the cut being accurate to within five thousandths of an inch.

It is accordingly an important object of my invention to provide a power driven automatic back gauge for paper cutting machines and the like which will afford rapid and efficient operation of the machine while at the same time ensuring ultraprecise location of the cut.

Another object is to provide such gauge which will be very rugged and require a minimum of maintenance but will nevertheless be capable of very delicate and precise adjustment.

Still another object is to provide motor control means for such gauge effective to start and stop the motor at exactly the desired point in the operation of the gauge without danger of imposing excessive stress thereon.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
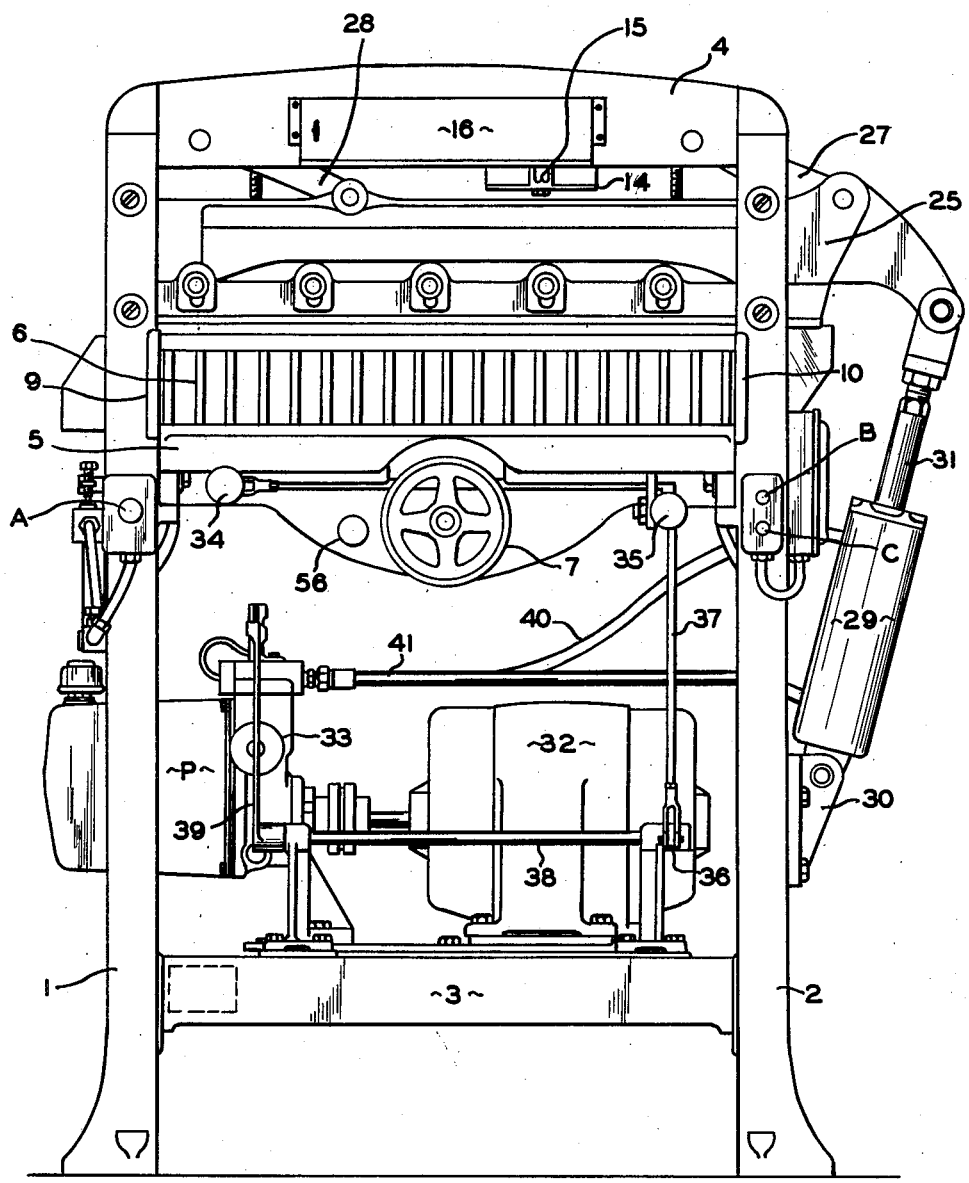
FIG. 1 is a front elevational view of a hydraulic paper cutting machine embodying the principles of my invention.

Referring now more particularly to such drawing and especially FIGS. 1 and 2 thereof, the general construction of the paper cutting machine illustrated will first be described, such machine being generally similar to that disclosed in my Patent 2,781,093 and co-pending application Serial No. 640,187, filed February 14, 1957, for "Hydraulic Paper Cutting Machine with Automatic Binder Clamp," now abandoned, to which further reference may be had. Such machine comprises the usual side frame members 1 and 2 interconnected by lower crossbrace 3 and upper frame or head member 4. A horizontal table 5 is carried between such side frame members and is adapted to support a stack of sheets for positioning thereon. A back gauge 6 may be adjusted forwardly or rearwardly along table 5 by means of hand wheel 7 and lead screw 8. Side gauges 9 and 10 are provided for lateral positioning of the stack. An endless steel tape 11 is attached to an upstanding post 12 mounted on back gauge 6 and passes around a rear pulley 13 and a forward pulley 14 where a pointer 15 is provided to indicate the exact position of the back gauge. A shaded lamp 16 illuminates the work upon the table.

The binder clamp 17 is mounted for vertical reciprocation in ways in the two side frame members 1 and 2 and is adapted to be thus reciprocated by means of links such as 18 pivotally interconnecting the respective ends thereof to spaced lever arms such as 19 clamped and keyed to torsion bar 20 journalled in such side frame members. Lever 19 has an oppositely extending arm 21 to which is pivotally connected the rod 22 of clamp operating fluid pressure cylinder 23. The lower end of such cylinder is pivotally mounted on bracket 24 attached to cross-member 3 of the machine frame.

The knife 25 is likewise mounted in the usual manner in vertical ways such as 26 in the side frame members 1 and 2 of the machine, being supported for downward swinging slicing action by links 27 and 28 pivotally secured to head frame member 4. The fluid pressure cylinder 29 is pivotally mounted on bracket 30 on side frame member 2 and its upwardly projecting rod 31 is pivotally connected to the outwardly projecting end of link 27. Accordingly, reciprocation of piston rod 31 serves to lower and raise the knife with a slicing action to cut a stack of sheets positioned on table 5 against back gauge 6 and one of the side gauges 9 and 10.

A pump P is mounted on cross-frame member 3 beneath table 5 and projecting through side frame member 1. It is driven by an electric motor 32 and is operative to deliver hydraulic fluid under pressure from a sump to control valve 33. A relief valve (not shown) is operative to return the pump delivery to the sump should the control valve or other part of the fluid pressure system become blocked. Reference may be had to my aforesaid co-pending application Serial No. 640,187 for a more detailed description of the construction and operation of the control valve 33.

To initiate operation of the machine, the operator moves safety lever 34 to free operating lever 35 which he then rocks with his other hand to rock lever 36 (through link 37) keyed to shaft 38, thereby in turn rocking the valve spool control lever 39 about the axis of shaft 38. The spool of valve 33 is accordingly shifted to admit fluid under pressure to the lower end of binder clamp cylinder 23 and piston rod 22 is thereby moved upwardly to rock torsion bar 20 to bring binder clamp 17 down into clamping engagement with a stack of sheets on table 5. When the binder clamp is all the way down on the stack and pressing firmly thereupon with a predetermined pressure, the back pressure built up in the line is utilized to actuate valve means (not shown) to direct fluid under pressure to line 40 leading to the upper end of knife cylinder 29, thereby to move piston rod 31 downwardly and thus bring down knife 25 to make the cut. The lower end of cylinder 29 is relieved through line 41, permitting return flow to sump.

Figure 2:
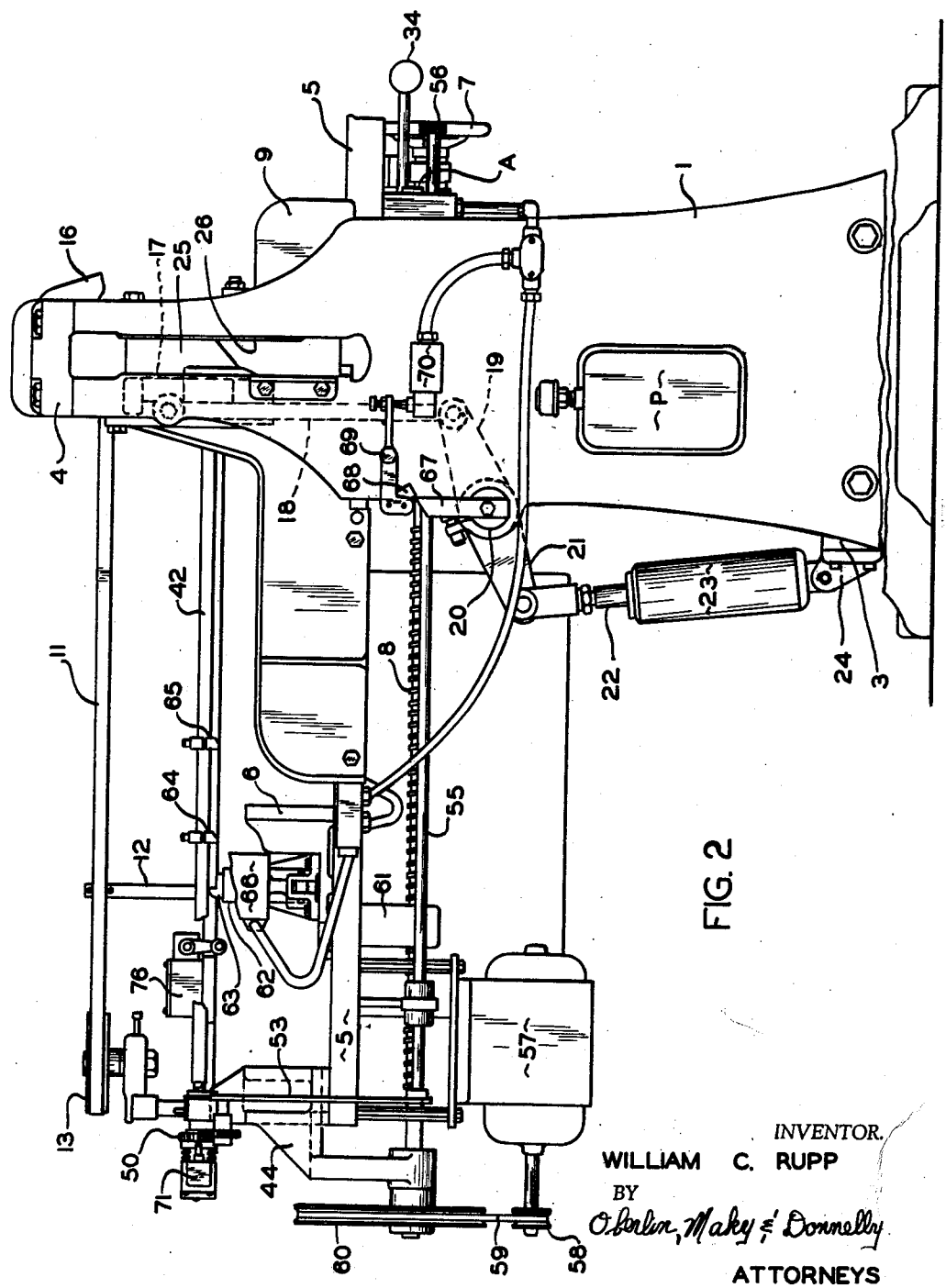
FIG. 2 is a side elevational view of the machine of FIG. 1.
Figure 4:
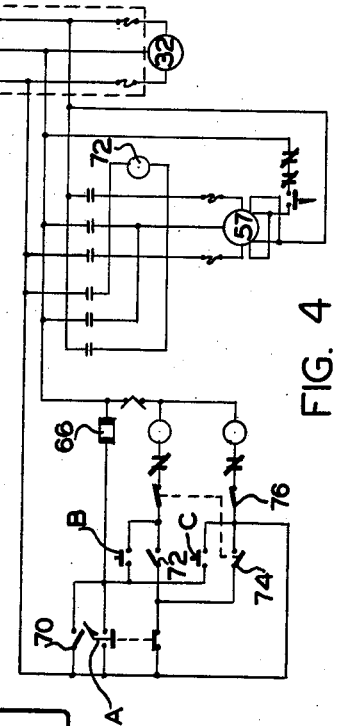
FIG. 4 is a wiring diagram of the electric control system.

As soon as the cut is thus made, the operator shifts valve 33 to admit fluid under pressure to line 41 and thereby to the lower end of knife cylinder 29 and also to admit fluid under pressure to the upper end of clamp cylinder 23 to raise the knife to the position indicated in FIG. 1 and to raise the binder clamp to the position shown in FIG. 2. The piston in the knife cylinder 29 is of greater diameter than the piston in clamp cylinder 23 so that the knife will be brought to its uppermost position or nearly so before the pressure in cylinder 23 becomes effective to retract rod 22 and elevate the clamp.

The above-described series of operations may desirably be interrelated with an automatic latch arrangement of the type disclosed in my aforesaid application Serial No. 640,187 whereby it becomes unnecessary for the operator to continue to hold his hand on lever 35 after he has once initiated upward movement of the knife and binder clamp.

Figure 3:
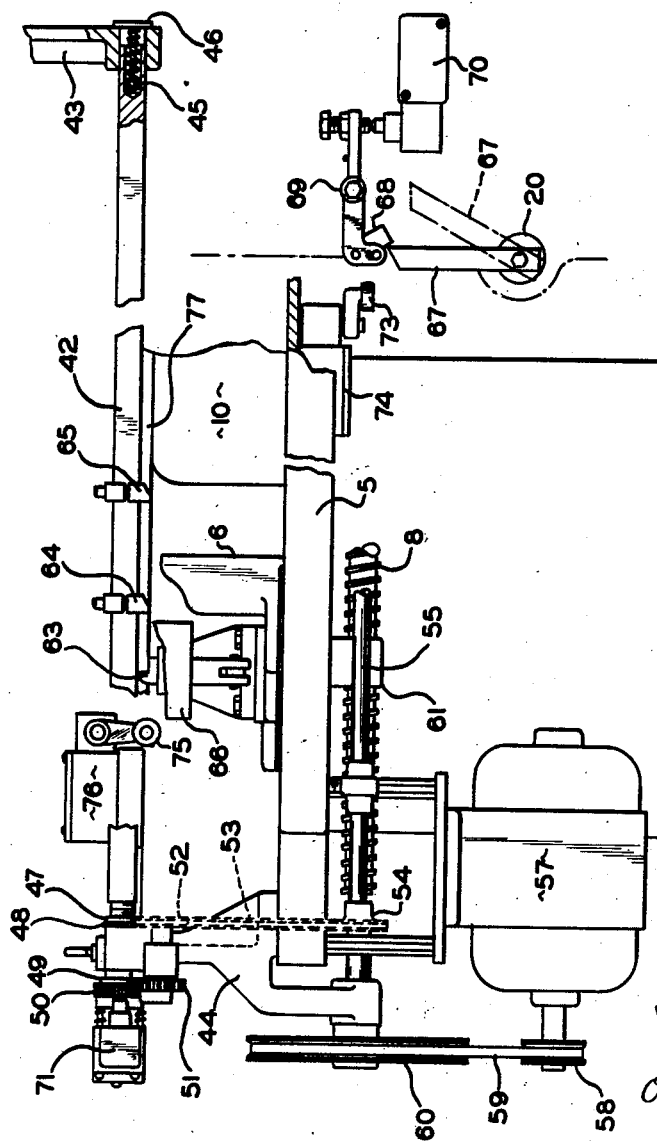
FIG. 3 is a fragmentary semi-diagrammatic side elevational view of the back gauge control means.

Special stop means are provided whereby the positioning of the back gauge 6 may be precisely predetermined for each cut (see my Patent No. 2,781,093). Referring more particularly to FIGS. 2 and 3 of the drawing, a longitudinally reciprocable bar 42 is mounted with its forward end supported by a bracket 43 attached to head frame 4 and its rear end in a bracket 44 mounted upon the rear end of table 5. As shown in FIG. 3, the forward end of such bar which is adapted to serve as a dog rail is drilled to receive a compression spring 45 bearing against a plate 46 secured to bracket 43 and accordingly tending to urge bar 42 rearwardly. The rearward end of bar or rail 42 is threadedly engaged within sleeve 47 having a snap ring 48 engaged therewith adapted to serve as a stop against one end of bracket 44 and a shoulder 49 adapted to limit reciprocation of rail 42 in the other direction (to the right as viewed in FIG. 3) by engagement with the other end of such bracket. A gear 50 is keyed to sleeve 47 intermeshing with gear 51 driven through pinion 52, chain 53 and pinion 54 keyed to adjusting shaft 55. Accordingly, by turning knurled knob 56 (FIG. 2), shaft 55 may be rotated correspondingly to rotate sleeve 47 slightly to shift dog rail 42 toward the right (forwardly) as viewed in FIG. 3 against the action of compression spring 45 and thereby likewise varying the space between shoulder 49 and the adjacent end of bracket 44 serving as a positive stop to limit reciprocation of dog rail 42 during operation of the machine.

An electric motor 57 is mounted on the underside of table 5 to drive lead screw 8 through pulley 58, belt 59 and pulley 60 keyed to the end of such screw. The screw threadedly engages nut 61 secured to the underside of back gauge 6 and depending therefrom through a longitudinal slot in table 5.

Mounted on the back gauge 6 for travel therewith is a cylinder 62 having a vertically upwardly projecting plunger 63 mounted for reciprocation therein. Such plunger is normally resiliently urged to upwardly projecting position successively to engage dogs or stops such as 64 and 65 firmly adjustably secured at desired spaced intervals on dog rail 42. Such plunger and stops are bevelled to permit rearward movement of back gauge 6, the plunger merely being temporarily cammed downwardly upon engagement with each such stop when traveling in this direction but firmly engaging an opposed stop when traveling in the other direction, i.e. forwardly. When the plunger thus engages a stop, a small amount of additional forward travel is permitted against the resilient action of compression spring 45 to the extent permitted by the space between shoulder 49 of sleeve 47 and the opposed end of bracket 44. After making the cut, the engaged stop may be cleared through energization of trip solenoid 66 to retract the plunger, whereupon compression spring 45 is immediately effective to shift rail 42 rearwardly to prevent re-engagement of the plunger with the same stop. The back gauge may accordingly now be advanced until the again extended plunger engages the next stop. Reference may be had to my Patent 2,781,093 for a further understanding of the above-described mechanism and optional modifications employing a plurality of parallel rails when it is desired to make especially closely spaced cuts. Certain details of the construction of the present invention may be better understood in conjunction with the following explanation of the operation of the same.

The operator sets and locks the stops or dogs 64, 65 in selected position on dog rail 42, using gauge blocks therebetween if especially precise spacing of the same is desired. The operator then actuates the machine to make a cut by moving safety lever 34 to the right (FIG. 1) while pressing down on operating lever 35. Lever 34 unlatches lever 35 and actuation of lever 35 serves to move the spool of hydraulic valve 33 to admit fluid under pressure to clamp cylinder 23 and knife cylinder 29 as above explained. When the knife is observed to engage the cutting stick in table 5, lever 35 is manually raised to cause the knife and clamp to return to their uppermost positions. As clamp 17 approaches such uppermost position, with corresponding rocking of shaft 20, the latch lever 67 keyed thereto is rocked back into engagement with the latch 68 pivotally mounted at 69 on side frame 1 of the machine with consequent slight rocking of such latch member to actuate limit switch 70. This limit switch is in the circuit including trip solenoid 66, and accordingly the solenoid is briefly energized to retract plunger 62 and disengage the latter from an opposed stop or dog, whereupon rail 42 jumps rearwardly to prevent re-engagement of the plunger with the same stop. Latch lever 67 continues to swing to the left as viewed in FIGS. 2 and 3 so that it soon passes latch 68 as the binder clamp reaches its position of maximum elevation, permitting latch 68 to return to normal position with consequent prompt opening of limit switch 70. Solenoid 62 is accordingly deenergized, and plunger 63 again extended.

When the stop bar or dog rail 42 was thus released by retraction of plunger 63 and caused to shift rearwardly through action of compression spring 45, its rearward end engaged and closed limit switch 71, thereby energizing the back gauge drive motor 57. More precisely, the plunger of limit switch 71 is adapted to be engaged by the carefully ground side face of gear 50 on sleeve 47 axially reciprocable with rail 42 and limit switch 71 is adjustably mounted on bracket 44 for precise positioning axially of such rail for a purpose explained more in detail below. The back gauge 6 is accordingly advanced until plunger 63 engages the next stop or dog on rail 42 whereupon such rail is shifted to the right (forwardly) as viewed in FIGS. 2 and 3 against the action of compression spring 45 and to the extent permitted by shoulder 49 on sleeve 47 (the position of such shoulder having previously been precisely manually adjusted through rotation of knob 56, shaft 55 and gear 50). It is very important that the drive motor 57 should not be prematurely deenergized so that there is always assurance that rail 42 has been shifted forwardly to the full extent permitted by such precisely pre-positioned shoulder 49, but at the same time it is also important that the motor should not continue to operate for an overlong period which might have the effect of jamming the side face of plunger 63 against the stop on rail 42 so firmly that subsequent energization of solenoid 66 would prove ineffective to overcome the resultant friction and retract the plunger. I have found that it is ordinarily desirable to deenergize the motor an instant before shoulder 49 engages the end of bracket 44, there being sufficient momentum even with dynamic braking of the motor to ensure that the latter will coast sufficiently to bring shoulder 49 properly against the end of bracket 44 but without imposition of excessive force. It will be found that adjustment of limit switch 71 may be required if fluctuation in the current supply to motor 57 is encountered.

The timing relay 72 regularly provided in conjunction with the commercially available "Dinabrake Motor" may control the dynamic braking of motor 57 to a period of about one-half second sufficient to bring the motor to a full stop but thereupon automatically discontinuing the braking action so that, if desired, the operator may manually adjust the back gauge by means of hand wheel 7.

A succession of cuts may be made in the manner indicated and after the last cut has been made, the back gauge will move to its maximum forward position whereupon the forward face of nut 61 will engage roller lever 73 of limit switch 74 on the underside of table 5 operative to reverse back gauge drive motor 57 and thereby to return the gauge to its rearmost position. The back gauge now contacts roller 75 of limit switch 76 adjustably mounted on a horizontal rail 77 carried by said gauge 10 and extending parallel to dog rail 42. Actuation of limit switch 76 serves again to reverse motor 57 to drive lead screw 8 to advance back gauge 6 until plunger 63 engages the first (i.e. rearmost) dog or stop on rail 42. It will thus be seen that a complete cycle of operation has been achieved.

To facilitate set-up or optionally manual control of operation of the machine, a selector switch A is provided whereby operation is rendered independent of knife limit switch 70. Switches B and C permit the operator to obtain forward and reverse actuation of the back gauge independently of the automatic spacing mechanism.

The machine of this invention is accordingly fully powered for rapid and effortless operation and the power drive means is controlled in a manner permitting obtaining a cut of ultra-precise accuracy.

Other modes of applying the principle of the invention may be employed, change being made as regards the details described, provided the features stated in any of the following claims or the equivalent of such be employed.

I therefore particularly point out and distinctly claim as my invention:

1. In a paper cutting machine having a table adapted to support a stack of sheets thereon, a knife mounted for reciprocation in a vertical plane to cut such stack, means adapted to reciprocate said knife, and a back gauge mounted on said table for reciprocation therealong toward and away from said knife to advance such stack into selected cutting position; a bar mounted for precisely limited axial reciprocation in a direction normal to the plane of said knife, resilient means urging said bar away from said knife, a stop mounted on said bar and adjustable therealong, means for securing said stop in selected position, a plunger mounted on said gauge beneath said bar for vertical reciprocation, resilient means normally effective to hold said plunger in upwardly extended position to engage said stop when said gauge is shifted toward said knife, whereby said bar may be reciprocated toward said knife and further advance of said gauge thereupon halted, solenoid means connected with said plunger adapted when energized to retract the latter downwardly out of stop-engaging position, whereupon said first resilient means becomes effective to return said bar away from said knife to displace said stop from plunger-engaging position, a normally open limit switch operative when closed to energize said solenoid, and switch-engaging means movable in synchronism with said clamp and knife to close said switch upon completion of downward reciprocation of said knife and to release said switch upon upward return movement of said knife; reversible electric motor drive means for said gauge, reversing switches for said motor located for actuation by said gauge at the foremost and rearmost positions of the latter, a motor control switch arranged for actuation by rearward reciprocation of said bar to energize said motor to drive said gauge in a forward direction and arranged for actuation by forward reciprocation of said bar when said plunger engages a stop to deenergize said motor, and control means for said motor effective to bring said deenergized motor to a full stop just as said bar is firmly pressed against the forward limit of its reciprocation.

2. In a paper cutting machine having a table adapted to support a stack of sheets thereon, a knife mounted for reciprocation in a vertical plane to cut such stack, means adapted to reciprocate said knife, and a back gauge mounted on said table for reciprocation therealong toward and away from said knife to advance such stack into selected cutting position; a bar mounted for precisely limited axial reciprocation in a direction normal to the plane of said knife, resilient means urging said bar away from said knife, a stop mounted on said bar and adjustable therealong, means for securing said stop in selected position, a plunger mounted on said gauge beneath said bar for vertical reciprocation, resilient means normally effective to hold said plunger in upwardly extended position to engage said stop when said gauge is shifted toward said knife, whereby said bar may be reciprocated toward said knife and further advance of said gauge thereupon halted, solenoid means connected with said plunger adapted when energized to retract the latter downwardly out of stop-engaging position, whereupon said first resilient means becomes effective to return said bar away from said knife to displace said stop from plunger-engaging position, a normally open limit switch operative when closed to energize said solenoid, and switch-engaging means movable in synchronism with said clamp and knife to close said switch upon completion of downward reciprocation of said knife and to release said switch upon upward return movement of said knife; reversible electric motor drive means for said gauge, reversing switches for said motor located for actuation by said gauge at the foremost and rearmost positions of the latter, a motor control switch arranged for actuation by rearward reciprocation of said bar to energize said motor to drive said gauge in a forward direction and arranged for actuation by forward reciprocation of said bar when said plunger engages a stop to de-energize said motor, and dynamic brake control means for said motor effective to bring said deenergized motor to a full stop just as said bar is firmly pressed against the forward limit of its reciprocation, and thereupon to release its braking action.

3. In a paper cutting machine having a table adapted to support a stack of sheets thereon, a knife mounted for reciprocation in a vertical plane to cut such stack, means adapted to reciprocate said knife, and a back gauge mounted on said table for reciprocation therealong toward and away from said knife to advance such stack into selected cutting position; a bar mounted for precisely limited axial reciprocation in a direction normal to the plane of said knife, resilient means urging said bar away from said knife, a stop mounted on said bar and adjustable therealong, means for securing said stop in selected position, a plunger mounted on said gauge beneath said bar for vertical reciprocation, resilient means normally effective to hold said plunger in upwardly extended position to engage said stop when said gauge is shifted toward said knife, whereby said bar may be reciprocated toward said knife and further advance of said gauge thereupon halted, solenoid means connected with said plunger adapted when energized to retract the latter downwardly out of stop-engaging position, whereupon said first resilient means becomes effective to return said bar away from said knife to displace said stop from plunger-engaging position, a normally open limit switch operative when closed to energize said solenoid, and switch-engaging means movable in synchronism with said clamp and knife to close said switch upon completion of downward reciprocation of said knife and to release said switch upon upward return movement of said knife; reversible electric motor drive means for said gauge, reversing switches for said motor located for actuation by said gauge at the foremost and rearmost positions of the latter, a motor control switch arranged for actuation by rearward reciprocation of said bar to energize said motor to drive said gauge in a forward direction and arranged for actuation by forward reciprocation of said bar when said plunger engages a stop to deenergize said motor, means adjustably mounting said motor control switch relative to said bar for positioning to deenergize said motor slightly prior to full forward reciprocation of said bar, and dynamic brake control means for said motor effective to bring said deenergized motor to a full stop just as said bar is firmly pressed against the forward limit of its reciprocation.

4. In paper cutting machines and the like having a movable gauge; positioning means for said gauge comprising stops, a counterstop on said gauge adapted successively to engage said stops, means mounting said stops for limited straight line movement in the direction of movement of said gauge when engaged by the counterstop on the latter, resilient means arranged to resist such movement of said stops, and means operable to disengage said counterstop and an opposite stop to enable said resilient means to shift said stop rearwardly out of counterstop-engaging position; reversible electric motor drive means for said gauge, reversing switches for said motor located for actuation by said gauge at the respective limits of movement of the latter, and a motor control switch arranged for actuation by said stop mounting means upon reciprocation of the same by said resilient means to energize said motor to drive said gauge and arranged for actuation by reciprocation of said stop mounting means in the opposite direction against the action of said resilent means to deenergize said motor, and control means for said motor effective to bring said deenergized motor to a full halt just as said stop mounting means has reached its full limit of reciprocation against the action of said resilient means.

5. In paper cutting machines and the like having a movable gauge; positioning means for said gauge comprising stops, a counterstop on said gauge adapted successively to engage said stops, means mounting said stops for limited straight line movement in the direction of movement of said gauge when engaged by the counterstop on the latter, resilient means arranged to resist such movement of said stops, and means operable to disengage said counterstop and an opposite stop to enable said resilient means to shift said stop rearwardly out of counterstop-engaging position; reversible electric motor drive means for said gauge, reversing switches for said motor located for actuation by said gauge at the respective limits of movement of the latter, and a motor control switch arranged for actuation by said stop mounting means upon reciprocation of the same by said resilient means to energize said motor to drive said gauge and arranged for actuation by reciprocation of said stop mounting means in the opposite direction against the action of said resilient means to deenergize said motor, and dynamic brake control means for said motor effective to bring said deenergized motor to a full halt just as said stop mounting means has reached its full limit of reciprocation against the action of said resilient means, said brake control means being thereupon operative automatically to release its braking action.

6. In paper cutting machines and the like having a movable gauge; positioning means for said gauge comprising stops, a counterstop on said gauge adapted successively to engage said stops, means mounting said stops for limited straight line movement in the direction of movement of said gauge when engaged by the counterstop on the latter, resilient means arranged to resist such movement of said stops, and means operable to disengage said counterstop and an opposite stop to enable said resilient means to shift said stop rearwardly out of counterstop-engaging position; reversible electric motor drive means for said gauge, reversing switches for said motor located for actuation by said gauge at the respective limits of movement of the latter, and a motor control switch arranged for actuation by said stop mounting means upon reciprocation of the same by said resilient means to energize said motor to drive said gauge and arranged for actuation by reciprocation of said stop mounting means in the opposite direction against the action of said resilient means to deenergize said motor, means adjustably mounting said motor control switch relative to said stop mounting means for positioning to deenergize said motor slightly prior to full reciprocation of said stop mounting means adjacent the action of said resilient means, and dynamic brake control means for said motor effective thereupon to bring said deenergized motor to a full halt just as said stop mounting means is firmly pressed against the forward limit of its reciprocation.

References Cited in the file of this patent

UNITED STATES PATENTS

| | | |
|---|---|---|
| 2,095,309 | Brackett | Oct. 12, 1937 |
| 2,270,848 | Jirousek | Jan. 27, 1942 |
| 2,538,972 | Magnani | Jan. 23, 1951 |
| 2,599,591 | Spiller | June 10, 1952 |
| 2,628,680 | Seybold | Feb. 17, 1953 |
| 2,781,093 | Rupp | Feb. 12, 1957 |
| 2,837,156 | Brehm | June 3, 1958 |
| 2,992,578 | Hribar | July 18, 1961 |

FOREIGN PATENTS

| | | |
|---|---|---|
| 117,840 | U.S.S.R. | May 15, 1958 |